United States Patent
Haggerty et al.

(10) Patent No.: US 11,283,925 B1
(45) Date of Patent: Mar. 22, 2022

(54) PACING LIMITED-CONTENT TEXT MESSAGES

(71) Applicant: Noble Systems Corporation, Atlanta, GA (US)

(72) Inventors: Christopher S. Haggerty, Atlanta, GA (US); Karl H. Koster, Sandy Springs, GA (US)

(73) Assignee: Noble Systems Corporation, Atlanta, GA (US)

( * ) Notice: Subject to any disclaimer, the term of this patent is extended or adjusted under 35 U.S.C. 154(b) by 0 days.

(21) Appl. No.: 16/739,621

(22) Filed: Jan. 10, 2020

(51) Int. Cl.
*H04M 3/42* (2006.01)
*H04L 12/66* (2006.01)
(Continued)

(52) U.S. Cl.
CPC ....... *H04M 3/5158* (2013.01); *H04M 3/5183* (2013.01); *H04M 3/5232* (2013.01); *H04M 3/5238* (2013.01)

(58) Field of Classification Search
CPC ............. H04M 3/5158; H04M 3/5183; H04M 3/5191; H04M 3/51; H04M 3/5175; H04M 3/4878; H04M 3/5231; H04M 3/42042; H04M 3/523; H04M 3/5232; H04M 3/5238; H04M 3/5235; H04M 3/54; H04M 3/58; H04M 3/42059; H04M 7/003; H04M 1/72552; H04M 3/42068; H04M 3/42195; H04M 3/42357; H04M 3/42365; H04M 3/42382; G06Q 10/10; G06Q 10/06311; G06Q 30/01; G06Q 10/109; H04L 67/10; H04L 67/306; H04L 67/02; H04L 65/1069; H04L 51/046; H04L 67/22; H04L 12/1895; H04L 51/02
(Continued)

(56) References Cited

U.S. PATENT DOCUMENTS 5,214,688 A 5/1993 Szlam et al.
5,247,569 A 9/1993 Cave
(Continued)

OTHER PUBLICATIONS

Noble Systems Corporation, Harmony Version 4.1 User Manual, Sep. 2015, 514 pages, Noble Systems Corporation, Atlanta, GA.
(Continued)

*Primary Examiner* — Ahmad F. Matar
*Assistant Examiner* — Kharye Pope
(74) *Attorney, Agent, or Firm* — Blank Rome, LLP

(57) ABSTRACT

Various embodiments of the invention provide methods, systems, and computer program products for sending an outbound communication to a party to generate an inbound communication from the party for a contact center. An expected response time is derived identifying a time the inbound communication is expected to be received from the party after sending the outbound communication to the party. In particular instances, an agent is identified who is expected to be available at the expected response time to handle the inbound communication when it is received by the party at the contact center. In addition, the content of the outbound communication may be composed to identify the agent to the party. Accordingly, the outbound communication is sent to the party so that the inbound communication can be routed to the agent upon being received.

18 Claims, 11 Drawing Sheets

(51) Int. Cl.
*H04M 3/51* (2006.01)
*H04M 3/523* (2006.01)

(58) Field of Classification Search
USPC ............. 379/265.09, 265.11, 265.12, 266.07
See application file for complete search history.

(56) References Cited

U.S. PATENT DOCUMENTS

| | | | |
|---|---|---|---|
| 5,295,184 A | 3/1994 | Smith et al. | |
| 5,309,505 A | 5/1994 | Szlam et al. | |
| 5,511,112 A | 4/1996 | Szlam | |
| 5,586,179 A | 12/1996 | Stent et al. | |
| 5,790,650 A | 8/1998 | Dunn et al. | |
| 5,815,566 A | 9/1998 | Ramot et al. | |
| RE36,416 E | 11/1999 | Szlam et al. | |
| 5,978,465 A | 11/1999 | Corduroy et al. | |
| 6,574,605 B1 | 6/2003 | Sanders et al. | |
| 7,035,927 B2 | 4/2006 | Flockhart et al. | |
| 7,095,841 B2 | 8/2006 | Mullen | |
| 8,254,555 B1 | 8/2012 | Noble, Jr. | |
| 8,259,924 B2 | 9/2012 | Korolev et al. | |
| 8,391,466 B1 | 3/2013 | Noble, Jr. | |
| 8,458,715 B1 | 6/2013 | Khosla et al. | |
| 8,472,612 B1 * | 6/2013 | Goringe | H04M 3/5231 379/266.01 |
| 8,553,873 B1 | 10/2013 | Noble, Jr. | |
| 8,638,925 B1 * | 1/2014 | Billman | H04M 3/5233 379/265.12 |
| 8,667,072 B1 * | 3/2014 | Cordell | H04L 51/10 709/206 |
| 8,781,092 B2 | 7/2014 | Noble, Jr. | |
| 8,831,207 B1 * | 9/2014 | Agarwal | H04M 3/5191 379/265.12 |
| 8,843,563 B1 | 9/2014 | Hartman | |
| 9,060,254 B2 | 1/2015 | Segall et al. | |
| 9,426,291 B1 | 8/2016 | Ouimette et al. | |
| 9,531,877 B1 | 12/2016 | Ouimette et al. | |
| 9,894,204 B1 | 2/2018 | Ouimette et al. | |
| 10,812,279 B1 * | 10/2020 | Walters | H04L 67/24 |
| 2003/0163343 A1 | 8/2003 | Meiser et al. | |
| 2003/0177231 A1 | 9/2003 | Flockhart et al. | |
| 2003/0185378 A1 | 10/2003 | Mullen | |
| 2006/0256949 A1 | 11/2006 | Noble, Jr. | |
| 2007/0073808 A1 * | 3/2007 | Berrey | G06Q 10/10 709/204 |
| 2008/0109334 A1 * | 5/2008 | Lewis | G06Q 40/00 705/35 |
| 2008/0120164 A1 * | 5/2008 | Hassler | G06Q 10/06 705/7.25 |
| 2010/0303225 A1 | 12/2010 | Shashkov et al. | |
| 2011/0069821 A1 | 3/2011 | Korolev et al. | |
| 2011/0238544 A1 * | 9/2011 | Segall | G06Q 20/102 705/34 |
| 2012/0213356 A1 | 8/2012 | Shashkov et al. | |
| 2012/0303476 A1 | 11/2012 | Krzyzanowski et al. | |
| 2012/0321072 A1 * | 12/2012 | Dooley | H04M 3/5233 379/265.12 |
| 2013/0083916 A1 | 4/2013 | Flockhart et al. | |
| 2013/0210468 A1 * | 8/2013 | Lowther | H04W 4/12 455/466 |
| 2014/0270138 A1 | 9/2014 | Uba et al. | |
| 2014/0341368 A1 | 11/2014 | Shashkov et al. | |
| 2015/0334233 A1 * | 11/2015 | O'Connor | G06F 16/24578 379/265.03 |
| 2016/0065738 A1 | 3/2016 | Schwartz et al. | |
| 2016/0094411 A1 * | 3/2016 | Brennan | H04L 41/046 709/224 |
| 2016/0247232 A1 * | 8/2016 | Agarwal | G06Q 40/06 |
| 2017/0005954 A1 * | 1/2017 | Shaltiel | H04L 51/02 |
| 2018/0063329 A1 * | 3/2018 | Mitchell | H04L 51/14 |
| 2018/0084111 A1 * | 3/2018 | Pirat | H04L 51/04 |
| 2019/0356778 A1 * | 11/2019 | Ghai | H04M 3/5166 |
| 2020/0153969 A1 * | 5/2020 | Dougherty | H04M 3/5166 |

OTHER PUBLICATIONS

Office Action Received for U.S. Appl. No. 14/884,877 dated Jun. 30, 2016.

Notice of Allowance Received for U.S. Appl. No. 14/884,877 dated Oct. 17, 2016.

Office Action Received for U.S. Appl. No. 15/353,797 dated Apr. 6, 2017.

Notice of Allowance Received for U.S. Appl. No. 15/353,797 dated Apr. 18, 2017.

Notice of Allowance Received for U.S. Appl. No. 15/600,889 dated Dec. 13, 2017.

* cited by examiner

PACING LIMITED-CONTENT TEXT MESSAGES

BACKGROUND

The Consumer Financial Protection Bureau ("CFPB") has proposed new rules governing activities of debt collectors that impose various communication limitations on third-party debt collectors. For instance, the new proposed rules set a limit of seven telephone call attempts that can be placed to a debtor within a seven-day period. Further, the debt collector is limited from engaging in more than one telephone conversation with a debtor regarding a particular debt within a seven-day period.

However, despite these limitations, the new rules also provide debt collectors with a new mechanism for contacting debtors known as "limited-content messages." Those acquainted with debt collection will be familiar with the concept of a "limited-content message" as specified by the CFPB. These limited-content messages can be voice or text based and do not constitute a prohibited third-party disclosure of a debt if heard or read by someone other than the debtor. In addition, the new rules do not limit the number of these messages that can be sent as text to a debtor without any seven-day cap.

Accordingly, a limited-content text message refers to a text message that qualifies as a limited-content message and is normally sent by a contact center operated by a debt collector to a debtor. A limited-content message is proposed as including the debtor's name, a request for the debtor to reply to the message, the name or names of one or more natural persons who the debtor can contact, a telephone number that the debtor can use to reply, and one or more ways the debtor can opt out of receiving any further electronic communications from the debt collector. In addition, certain information that may be optionally included in the text message is a salutation, the date and time of the message, a generic statement that the message relates to an account, and suggested dates and times for the debtor to reply to the message.

In the context of a contact center, the name of the person identified in the text message who the debtor is to contact is normally an agent employed by the contact center. It is permissible to use an alias for the agent. However, if an alias is used, the alias must be consistently used and must not interfere with the ability of the debt collector to identify the particular agent referenced in the text message. That is to say, it is not acceptable for a limited-content text message to inform the debtor that he or she should reply back to "John" or "John Smith," wherein any agent can be identified as such in the contact center. Rather, a one-to-one correlation between an alias and a particular agent should exist.

Accordingly, a contact center may make use of a limited-content text message to prompt a debtor to call the contact center. However, using such a mechanism to entice the debtor to call the contact center can lead to complications. For example, the limited-content text message must identify a particular agent by name and the recipient of the message will typically review the message within a few minutes upon receiving the message. Thus, if the recipient decides to respond to the limited-content text message, he or she is likely to respond within a relatively short period of time after receiving the message and is likely to request to speak with the agent identified in the message. Therefore, ideally, the limited-content text message should be sent to the debtor at a time so that when the debtor calls into the contact center, the agent identified in the message is available to speak with the debtor. However, identifying this time may not be trivial.

Furthermore, not every recipient of a limited-content text message is going to respond to the message. Therefore, although the contact center ideally wants to send out a limited-content text message to a debtor at a particular time so that the agent identified in the message is available when the debtor responds to the message by calling the contact center, in reality the contact center will likely need to send out multiple limited-content text messages to multiple debtors before receiving a single call for a particular agent. Thus, another complicated issue in using limited-content text messages is determining the number of such messages that should be sent out at any given time identifying a particular agent.

Accordingly, a need exists in the industry for a process for pacing limited-content text messages in a contact center environment. It is with respect to these considerations and others that the disclosure herein is presented.

BRIEF SUMMARY

In general, embodiments of the present invention provide computer program products, methods, systems, apparatus, and computing entities for sending an outbound communication to a party to generate an inbound communication from the party for a contact center. Various embodiments of the invention involve deriving an expected response time identifying a time the inbound communication is expected from the party at the contact center after sending the outbound communication to the party. Here, in particular embodiments, the expected response time may be determined by deriving an expected amount of time to respond, in which the expected amount of time to respond identifies an amount of time the party is expected to take to respond after receiving the outbound communication, and determining the expected response time based on a time the outbound communication is to be sent to the party and the expected amount of time to respond.

In particular instances, an agent who is expected to be available at the expected response time may be identified to handle the inbound communication when the inbound communication is received from the party at the contact center. In addition, the content of the outbound communication may be composed to identify the agent to the party. Accordingly, the outbound communication is sent to the party so that the inbound communication from the party can be routed to the agent upon being received by the contact center. In some instances, the routing of the inbound communication to the agent may be the result of the party requesting to be connected with the agent.

Different factors may be considered in identifying the agent. For instance, the agent may be identified in particular embodiments based on a capability of the agent to handle virtually simultaneous communications and/or a number of inbound communications the agent is already identified to handle. In addition, the agent may be identified based on currently being available in response to the expected response time being less than a threshold of time. Further, the agent may be identified based on working a current shift in response to the expected response time being over the threshold of time but during the current shift. Furthermore, the agent may be identified based on currently being scheduled for a later shift in response to the expected response time being after the current shift.

Finally, various embodiments of the invention may involve deriving a best time to send the outbound communication to the party. Here, in particular embodiments, the best time to send the outbound communication to the party may be derived based on sending the outbound communication to maximize a likelihood of generating the inbound communication. While in other embodiments, the best time to send the outbound communication to the party may be derived based on sending the outbound communication to maximize a likelihood of obtaining a promise to pay on a debt from the party.

Accordingly, the subject matter disclosed herein may be implemented as a computer-controlled apparatus, a method, a computing system, or as an article of manufacture such as a computer-readable storage medium. These and various other features will be apparent from the following Detailed Description and the associated drawings.

This Summary is provided to exemplify concepts at a high-level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE SEVERAL VIEWS OF THE DRAWINGS

Reference will now be made to the accompanying drawings, which are not necessarily drawn to scale, and wherein.

DETAILED DESCRIPTION

Figure 1:
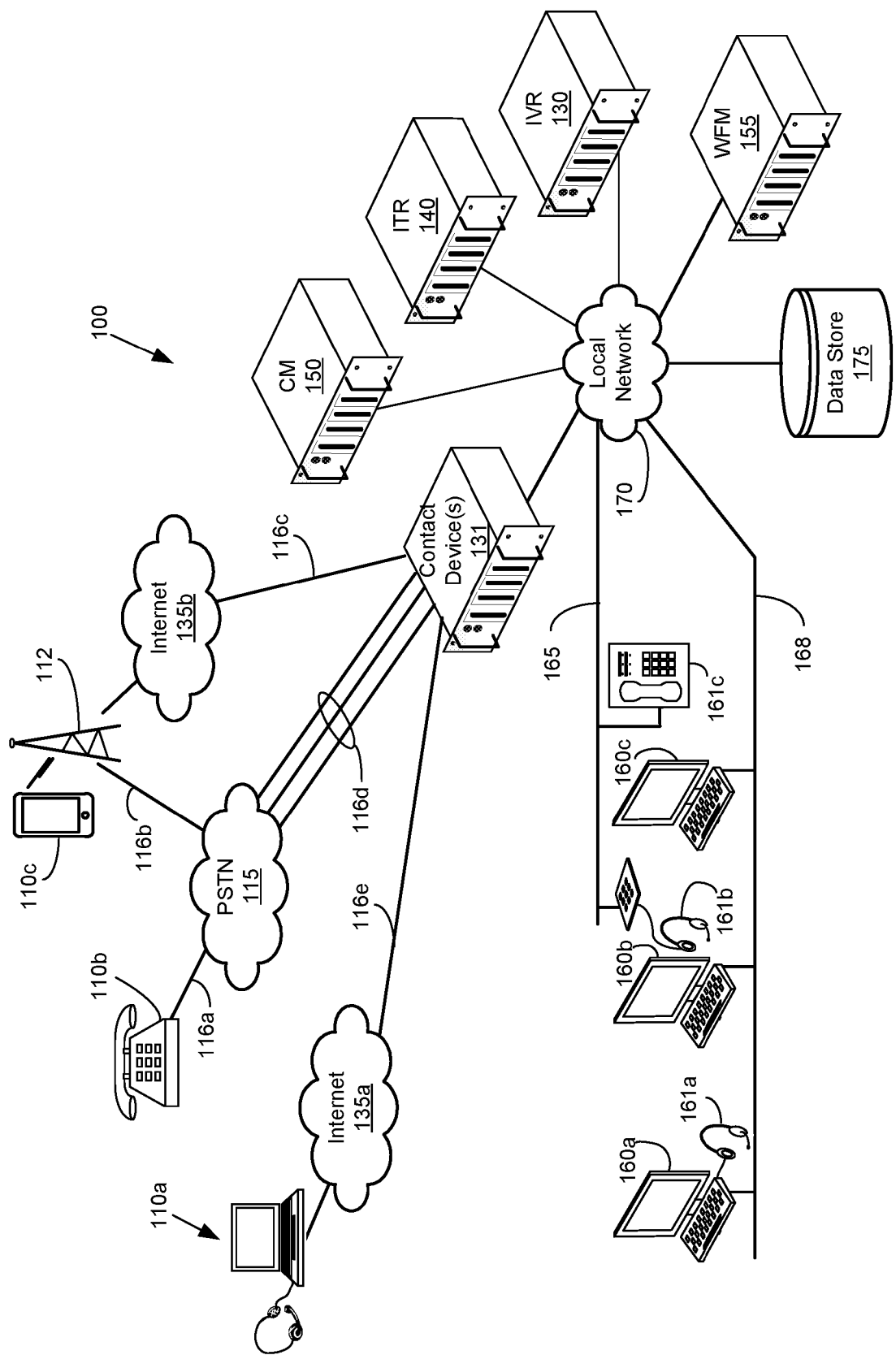
FIG. 1 shows one embodiment of a contact center architecture illustrating the various technologies disclosed herein.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Exemplary Contact Center Architecture

FIG. 1 shows one embodiment of a contact center architecture 100 illustrating the various technologies disclosed herein. The contact center architecture 100 shown in FIG. 1 may process various channels of communication such as voice calls, facsimiles, emails, text messages, video calls, Web chats, etc. that generally make up a combination of both inbound and outbound traffic (sometimes referred to as a "blended" contact center). In particular instances, the contact center may be referred to as a call center. However, for purposes of this disclosure, the term "contact center" is used throughout, although it is understood that the two are synonymous.

With that said, the contact center may handle communications originating from a remote party or initiated to a remote party. Thus, the term "party," without any further qualification, refers to an individual associated with a communication processed by the contact center, where the communication is either received from or placed to the party.

Depending on the embodiment, communications may originate to or be received from parties that use a variety of different devices. For instance, a party may receive or place a voice call using a conventional analog telephone 110b connected to a public switched telephone network ("PSTN") 115 using an analog plain old telephone service ("POTS") line 116a. The call may be routed by the PSTN 115 and may comprise various types of facilities 116d, including, but not limited to: T1 trunks, SONET based fiber optic networks, ATM networks, etc. Various types of routers, switches, bridges, gateways, and other types of equipment may be involved in the processing of communications.

In addition, a party may receive or place a communication using a device such as a desktop or laptop computer 110a, a smart phone 110c, mobile phone, tablet, or other mobile device. Depending on the device, these communications may be placed or received via an Internet provider 135a, 135b and/or wirelessly via a mobile service provider ("MSP") 112. For instance, communications may be routed to the PSTN 115 using an integrated services digital network ("ISDN") interface 116b or other type of interface that is well known to those skilled in the art. While in other instances, the MSP 112 may route communications as packetized data to/from an Internet provider 135b using Internet-based protocols. For convenience, unless indicated otherwise, the term "trunk" refers to any type of facility 116c, 116d, 116e providing communication to, or from, the contact center, regardless of the type of protocol or technology used. Specifically, a "trunk" is not limited to time-division multiplexing ("TDM") technology. Those skilled in the art will recognize that a variety of protocols and facilities may be used to convey communications.

Accordingly, the contact center may implement various contact devices 131 for initiating and receiving communications based on the channel of communication. For instance, in various embodiments, communications such as inbound calls and/or inbound text messages are received from parties by a contact device 131 such as an automatic call distributor ("ACD"). In particular embodiments, the ACD may be a specialized switch for receiving and routing inbound calls and/or text messages under various conditions. Further, the ACD may be embodied as a dedicated form of equipment readily available from various manufacturers, or the ACD may be a so-called "soft switch" comprising a suitable programming module executed by a processing device to perform the necessary functions. The ACD may route an incoming call and/or text message over contact center facilities 165, 168 to an available agent. Depending on the embodiment, the facilities 165, 168 may be any suitable technology for conveying the call and/or message, including but not limited to a local area network ("LAN"), wide area network ("WAN"), ISDN, and/or conventional TDM circuits. The exact details typically depend in part on the technology used. For example, in one embodiment, first facilities 165 may be analog or proprietary voice communication technology whereas second facilities 168 may be SIP oriented. As may be appreciated, there are various technologies and configurations that are possible. In addition, the facilities 165, 168 may be the same or different from the facilities used to transport the call and/or message to the ACD.

Depending on the embodiment, the ACD may place a call and/or text message in a queue if there is no suitable agent available. Further, the ACD may route a call to an interactive voice response system ("IVR") 130 to play voice prompts and/or may route a text message to an interactive text response system ("ITR") 140 to send message prompts. Depending on the embodiment, these prompts may solicit information from the party and the IVR 130 and/or ITR 140 may collect and analyze responses from the party in the form of dual-tone multiple frequency ("DMTF") tones, speech, and/or text. In addition, the IVR 130 and/or ITR 140 may be used to further identify the purpose of the call or text message, such as, for example, prompting the party for an individual's name (agent's name), to provide account information, and/or otherwise to obtain information used to service the call or text message. Further, in particular embodiments, the IVR 130 and/or ITR 140 may interact with other components, such as a data store 175, to retrieve or provide information for processing the call or text message.

Continuing on, in various embodiments, communications such as outbound calls and/or outbound text messages may be sent using another contact device 131 such as a dialer (e.g., predictive dialer). Again, the dialer may be embodied as a dedicated form of equipment readily available from various manufacturers, or the dialer may be a so-called "soft switch" comprising a suitable programming module executed by a processing device to perform the necessary functions. Accordingly, a predictive dialer is a type of dialer that may originate calls and/or text messages to multiple telephone numbers simultaneously with the expectation that agents will be available to handle one or more of the calls that are answered and/or text messages that are responded to. In various embodiments, the predictive dialer may make use of one or more algorithms and/or information to determine how and when to dial/text numbers so as to maximize a desired outcome and/or to minimize the likelihood of a party being placed in a queue while maintaining target agent utilization.

Depending on the embodiment, other contact devices 131 may be used for originating and/or receiving other channels of communication such as Web chats, emails, text messages, etc. For example, the contact center may make use of a web server to host Web pages and interact with parties via Web chats. In addition, the contact center may make use of an email server to receive and send emails from parties. While in other embodiments, the contact center may convey and/or receive text messages to/from a gateway instead of an ACD or dialer, which then conveys the messages to the Internet 135b and on to a mobile service provider 112. In these particular embodiments, such a gateway may provide a way for the contact center to send and/or receive text messages that are not in a native protocol and can be accepted or conveyed by the mobile service provider 112.

Again, information associated with these other channels of communication may be stored in the data store 175. In addition, like calls, a transfer-like operation may be used in various embodiments to connect a communication that has been answered and/or received with an available agent, or if an agent is not available, a queueing operation may be used to place the communication in a queue until an agent is available.

In addition, in various embodiments, the contact center may make use of a campaign monitoring system ("CM") 150 to monitor active campaigns and to direct the contact devices 131 on pacing outbound communications to various parties. Depending on the embodiment, the CM 150 may keep track of various information used to pace outbound communications accordingly. For instance, the contact center may wish to send out text messages to multiple parties requesting the parties to call the contact center. Here, the CM 150 may determine when and how such SMS text messages should be sent based on when the calls are expected to be received from the parties and the availability of resources (e.g., agents) to handle the calls when received. The CM 150 may then direct the corresponding contact device 131 to send the text messages accordingly.

Further, an agent at the contact center typically uses a computing device 160a-160c, such as a personal computer, and a voice device 161a-161c to handle communications. The combination of computing device 160a-160c and voice device 161a-161c may be referred to as a "workstation." However, in particular embodiments, the computing device 160a-160c may also handle voice (e.g., VoIP) or voice capabilities may not be needed so that reference to an agent's "workstation" may only refer to a computing device 160a-160c without the use of a separate voice device 161a-161c.

Agents typically log onto their workstations prior to handling communications and this allows the contact center to know which agents are available to potentially receive communications. In particular embodiments, the contact center may also maintain information on each agent's skill level that may be used to route a specific communication to an agent or group of agents having the same skill level.

Depending on the embodiment, interaction between a contact device 131, as well as other components within the contact center architecture 100, and agent's workstation may involve using a local area network ("LAN") 170. In addition, in particular embodiments, an agent may interact with components that provide information to the agent's workstation. For example, when a communication is directed to an agent, information about the party on the communication may be presented to the agent's computer device 160a-160b over the LAN 170 using facility 168.

Finally, another component that is employed in the contact center architecture 100 shown in FIG. 1 is a workforce management system ("WFM") 155. In various embodiments, the WFM 155 maintains information and generates agents' schedules to effectively handle inbound/outbound communications. For instance, in particular embodiments, the WFM 155 maintains historical communication volume information for various types of communication campaigns and generates forecasts for expected communication volume based on the historical information to predict the number of agents needed to handle the communication volume at a defined service level. The WFM 155 then applies the forecasts and information about available agents to generate work rosters of agents (e.g., schedules). That is to say, the WFM 155 schedules agents for work shifts according to the anticipated needs of the communication campaigns.

Although a number of the above entities may be referred to as a "component," each may also be referred to in the art as a "computing device," "unit," "server," or "system." A component may incorporate a local data store and/or interface with an external data store. Use of the word "server" does not necessarily require the component to interact in a formal client-server arrangement with other components, although that may be the case. Further, the above components may be located remotely from (or co-located with) other components. Furthermore, one or more of the components may be implemented on a single processing device to perform the functions described herein. In addition, the contact center architecture 100 may be provided as a hosted solution, where the call processing functionality is provided as a communication or software service (a so-called "communication-as-a-service" ("CaaS") or "software-as-a-service" ("SaaS")) to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Those skilled in the art will recognize FIG. 1 represents one possible configuration of a contact center architecture 100, and variations are possible with respect to the protocols, facilities, components, technologies, and equipment used.

Exemplary System Operation

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Pacing Module

Figure 2:
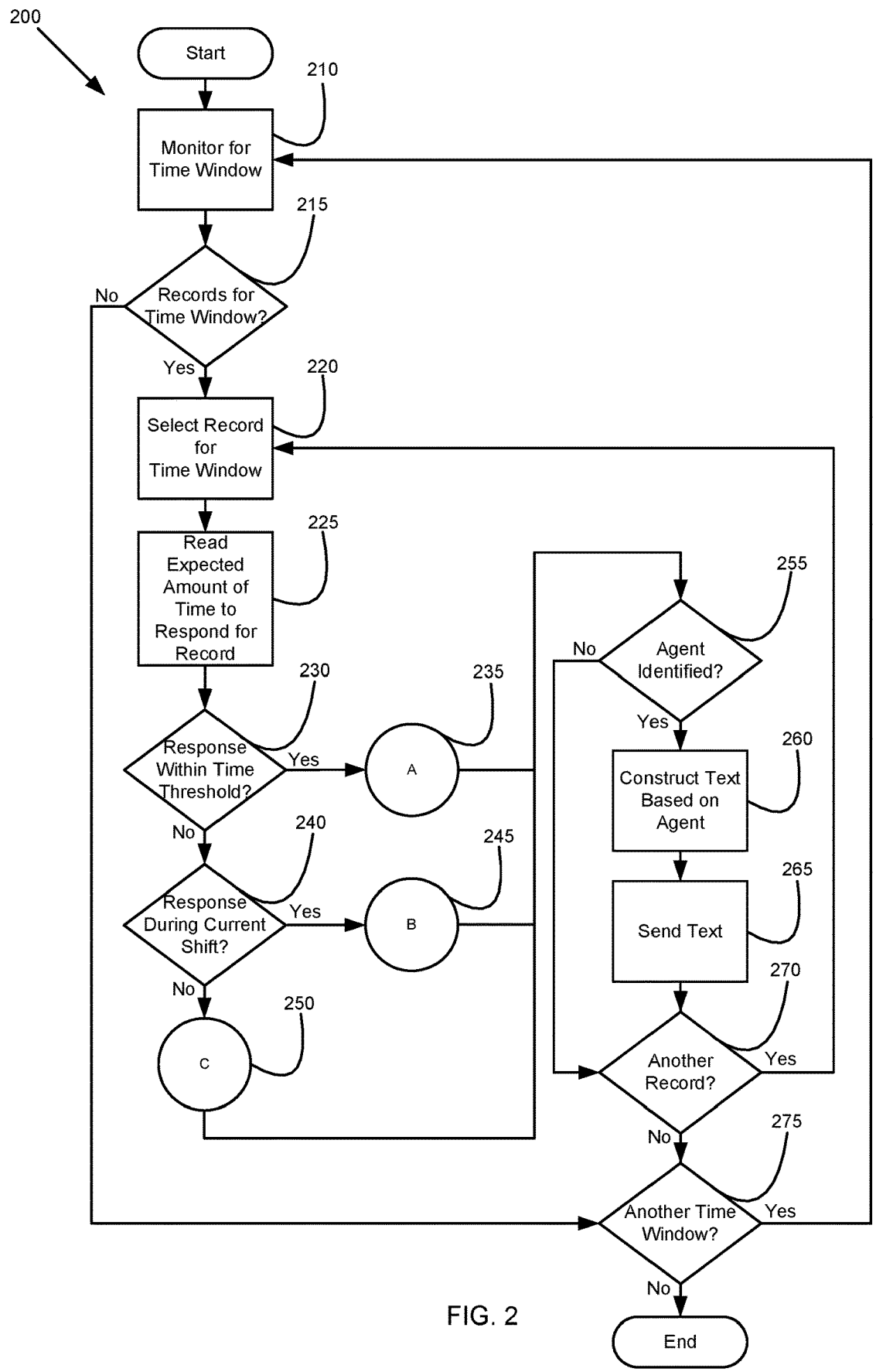
FIG. 2 is a flowchart illustrating a pacing module that can be used in accordance with various embodiments of the present invention.

Additional details are provided in FIG. 2 regarding a process flow for pacing outbound limited-content text messages. Here, the term "pacing" is understood to be determining when one or more communications are to be sent. In particular, FIG. 2 is a flow diagram showing a pacing module for performing such functionality according to various embodiments of the invention. For example, the flow diagram shown in FIG. 2 may correspond to operations carried out by one or more processors in one or more components, such as, for example, a contact device 131 like an ACD, a dialer, or a gateway or a CM 150, as it executes the pacing module stored in the component's volatile and/or nonvolatile memory.

An example is now provided to help facilitate the reader's understanding of the pacing module. However, it should be understood that this example is provided for clarification purposes only and should not be construed to limit the scope of the invention. In the example, a contact center is conducting a campaign for a debt collector in which limited-content text messages are being sent to a number of debtors in hopes of enticing the debtors to call into the contact center to talk with agents about making payments on debts. Therefore, in this instance, each text message identifies one or more agents who the debtor is advised to contact and a telephone number for the debtor to call. The objective in particular embodiments is to send the limited-content text messages at appropriate times that will lead to the debtors calling into the contact center when the agents identified in the messages are available to speak with the debtors.

With this in mind, the contact center in various embodiments identifies a "best time to text" ("best time to send") and an "expected amount of time to respond" for each of the debtors who is to receive a text message ahead of the contact center conducting the campaign for the debt collector. Here, the best time to text identifies the time the text message should be sent to the debtor. This time is generally based on facilitating a desired outcome as a result of sending the text message to the debtor. For example, the best time to text may be based on maximizing the likelihood of the debtor responding to the text message by placing a call to the contact center. While in another instance, the best time to text may be based on maximizing the likelihood of the debtor, not only responding to the text message by placing a call to the contact center, but also providing a promise to pay on the debt while on the call with an agent. Depending on the embodiment, the best time to text may identify a specific time that the text message should be sent (e.g., 2:19 p.m.) or a time window in which the text message should be sent (e.g., 2:00 p.m. to 3:00 p.m.).

The expected amount of time to respond identifies an amount of time the contact center expects the debtor to take before responding to the text message once received. For instance, the expected amount of time to respond for a particular debtor may be twelve minutes, indicating the contact center expects to receive a call from the debtor twelve minutes after sending the limited-content text message to him or her. Again, depending on the embodiment, the expected amount of time may identify a specific amount time such as twelve minutes or a time window such as eight to sixteen minutes.

The contact center may determine the best time to text and the expected amount of time to respond for a debtor using different approaches depending on the embodiment. For instance, in particular embodiments, the contact center may make use of the approach described in U.S. patent application Ser. No. 16/723,309 entitled "Best Time to Send Limited-Content Text Messages to Parties," the contents of which are incorporated for all that they teach.

Turning now to FIG. 2, the pacing module begins the process 200 of pacing the limited-content text messages by monitoring for time windows in Operation 210. In this particular instance, the best time to text is identified for each debtor as a time window in which the text should ideally be sent to the debtor. For example, the best time to text for each debtor may be identified as an hour window of a work shift spanning eight hours. Here, the pacing module may be configured to identify at the top of each hour what text messages should be sent for the current hour. For instance, if the best time to text for a particular debtor is identified as the 2:00 p.m. to 3:00 p.m. time window, then the pacing module may identify this record at the top of the 2:00 p.m. hour.

Therefore at the top of each hour, the pacing module determines whether any records (debtors) exist for the current time window in Operation 215. If no records exist for the particular time window, then the pacing module checks whether another time window exists (e.g., at least one more hour exists in the shift) in Operation 275. If so, then the pacing module returns to Operation 210 and continues to monitor for a time window.

However, if records do exist for the time window, then the pacing module selects one of the records for the time window in Operation 220 and reads the expected amount of time to respond for the selected record in Operation 225. Here, the pacing module may be configured to read the expected amount of time to respond from some type of data store, such as the data store 175 shown in FIG. 1, or the module may be configured to determine the expected amount of time to respond for the selected record.

At this point, the pacing module determines whether one or more agents may be available when the telephone call is expected at the contact center based on the expected amount of time to respond and if so, the module identifies one or more of these available agents to handle the call when it is actually received. Generally speaking, a typical recipient of a text message will likely respond to the text message within a few minutes of receiving the message. However, that may not always be the case. Instead, a particular debtor may take several minutes or up to an hour or more to respond to a text message.

Therefore, the pacing module is configured in particular embodiments to handle identifying potential agents to receive the call for the particular record at an expected response time based on the expected amount of time to respond. For example, if the expected amount of time to respond is six minutes for the debtor and the text is expected to be sent at 2:14 p.m., then the expected response time is 2:20 p.m. Again, depending on the embodiment, the expected response time may be represented as a specific time (e.g., 2:20 p.m.) or as a window of time (e.g., 2:15 p.m. to 2:25 p.m.).

Here, the contact center may set a threshold of time for identifying instances in which the center considers a debtor is expected to respond almost immediately (e.g., within a few minutes) after receiving the text message. For instance, the contact center may set a threshold of five minutes. The intention of setting this threshold is that calls received from debtors (records) with an expected response time within the threshold are calls that need to be handled by agents who are currently available or who will become available within a short period of time.

Figure 3:
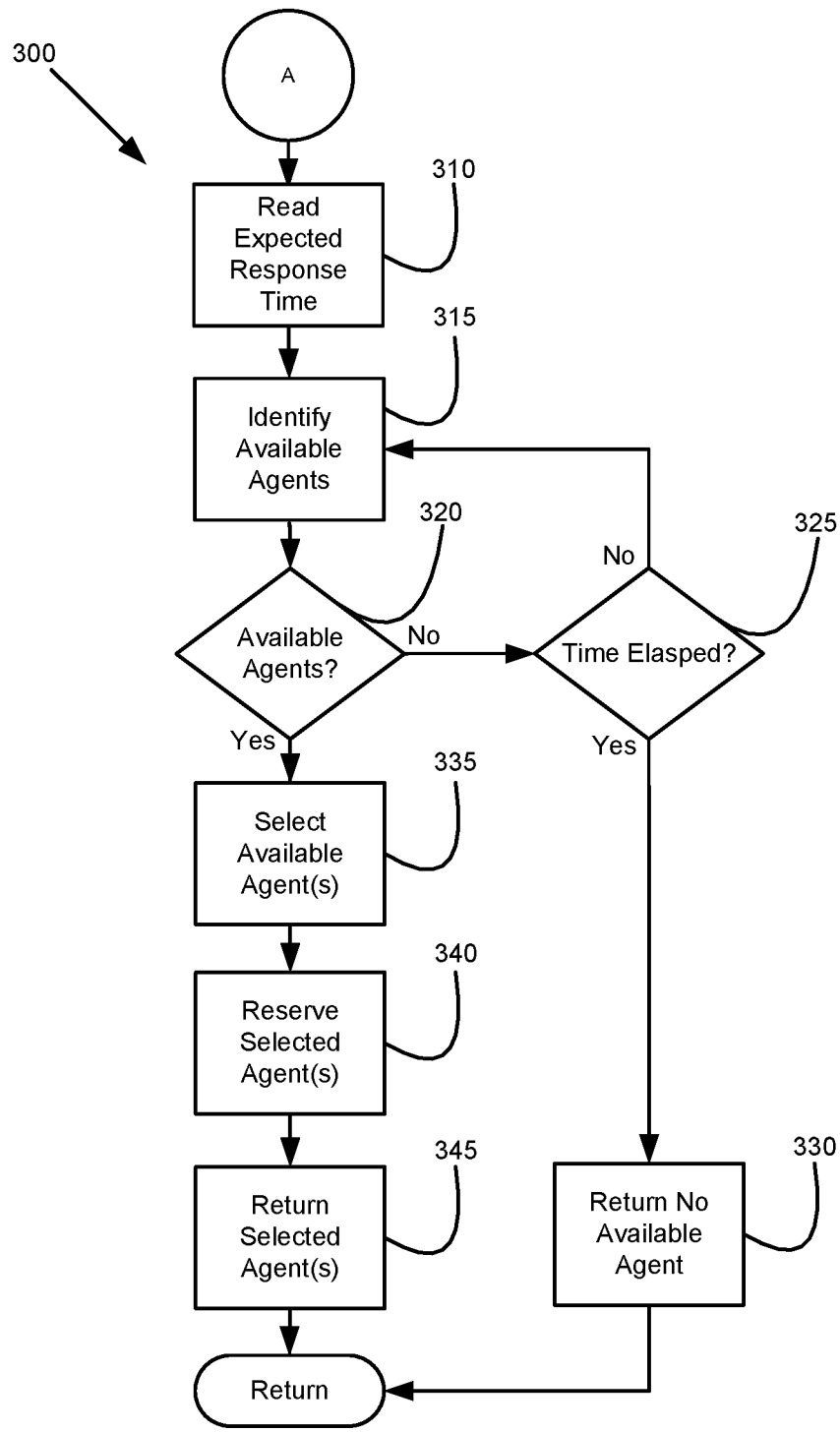
FIG. 3 is a flowchart illustrating an identify available agent module that can be used in accordance with various embodiments of the present invention.

Thus, if the pacing module determines in Operation 230 that the expected response time is within the threshold of time, then the module identifies one or more of the agents who are currently available or who will become available within a short period of time in Operation 235. The pacing module performs this particular operation in various embodiments by invoking an identify available agent module (FIG. 3). Accordingly, the identify available agent module identifies one or more of the agents to handle the call expected to be received from the debtor for the selected record. In addition, in particular embodiments, the identify available agent module may be configured to also "reserve" the one or more agent(s) to ensure these agent(s) are available to handle a call from the debtor when the call is received at the contact center. In this context, a reserved agent is an agent who may be limited with respect to handling other matters (e.g., communications) for the contact center so that the agent will be available to immediately handle a call received from the debtor. As is discussed in further detailed herein, the agent may be reserved for a period of time so that he or she is available to immediately handle the call when it is received from the debtor.

However, if the expected response time is not within the threshold of time, then the pacing module determines whether the expected response time will occur during the current shift in Operation 240. Such a determination is made by the pacing module because although the expected response time is not almost immediately after sending the debtor the text message, the agents who are currently working during the shift will still likely need to handle the call received from the debtor. Therefore, if the expected response time will occur during the current shift, then the pacing module identifies one or more of the agents who are currently working the shift in Operation 245. In specific embodiments, the pacing module performs this operation by invoking an identify current agent module (FIG. 4) and the identify current agent module identifies such agents to handle the call expected to be received during the shift from the debtor for the selected record.

Figure 5:
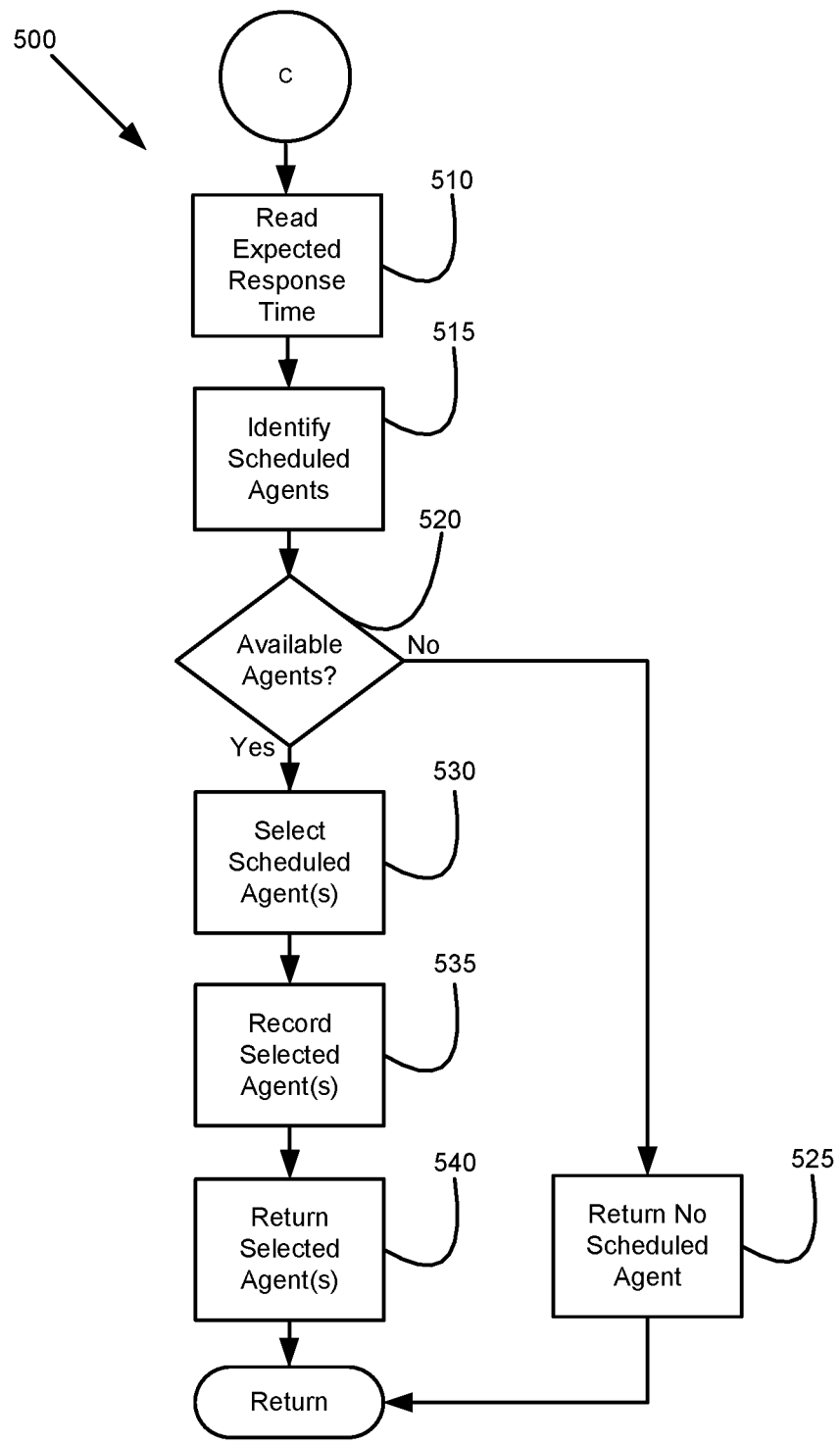
FIG. 5 is a flowchart illustrating an identify scheduled agent module that can be used in accordance with various embodiments of the present invention.

Finally, if the expected response time is beyond the current shift, then the pacing module identifies the agents expected to be working at the time when the call is expected to be received from the debtor for the selected record in Operation 250. In particular embodiments, the pacing module performs this particular operation by invoking an identify scheduled agent module (FIG. 5). In turn, the identify scheduled agent module identifies the agents who are scheduled to be working during the time the call from the debtor is expected to be received by the contact center.

At this point, the pacing module determines whether at least one agent has been identified to handle the expected call from the debtor for the selected record in Operation 255. If so, then the pacing module constructs the text message to send to the debtor based on the identified agent(s) in Operation 260. That is to say, the pacing module composes the content of the limited-content text message to send to the debtor by inserting the name(s) of the identified agent(s) into the message.

At this point, the pacing module sends the limited-content text message to the debtor in Operation 265. Accordingly, depending on the embodiment, the pacing module may perform this particular operation by making use of one or more components of the contact center such as one or more of the contact devices 131 discussed above with respect to FIG. 1.

Once the text message has been sent, the pacing module determines whether another record exists for the time window in Operation 270. If so, then the pacing module returns to Operation 220, selects the next record, and repeats the operations just discussed for the newly selected record. Once all of the records have been processed for the current time window, the pacing module determines whether another time window exists in Operation 275. If so, then the pacing module returns to Operation 210 and continues to monitor for the next time window. If not, then the pacing module stops the process.

Identify Available Agent Module

Additional details are provided in FIG. 3 regarding a process flow for identifying one or more available agents to handle a call expected to be received from a debtor who has received a limited-content text message. In particular, FIG. 3 is a flow diagram showing an identify available agent module for performing such functionality according to various embodiments of the invention. For example, the flow diagram shown in FIG. 3 may correspond to operations carried out by one or more processors in one or more components, such as, for example, a contact device 131 like an ACD, a dialer, or a gateway or a CM 150, as it executes the identify available agent module stored in the component's volatile and/or nonvolatile memory.

As the reader may recall, the identify available agent module may be invoked by the pacing module in various embodiments upon the pacing module determining the expected response time for a particular record is within a threshold of time. That is to say, the pacing module may invoke the identify available agent module as a result of determining a call is expected to be received from a debtor for a particular limited-content message in a short period of time (e.g., within five minutes). However, in other embodiments, the identify available agent module may be invoked by a different module or may be a stand-alone module that independently executes to identify one or more agents for a particular limited-content text message to be sent to a debtor.

Accordingly, the process 300 begins in various embodiments with the identify available agent module reading the expected response time in Operation 310. Here, depending on the embodiment, the identify available agent module may be provided the expected response time from another module such as the pacing module, or the identify available agent module may retrieve the expected response time from some type of data store 175.

Next, the identify available agent module identifies the agents who are available to handle the call expected to be received in Operation 315. For instance, in various embodiments, the identify available agent module identifies those agents who are currently working (who are currently logged into a workstation) and are not actively handling another matter (e.g., communication) for the contact center. In addition, the identify available agent module in particular embodiments may determine whether any agents may become available before the expected call is received. Here, for instance, the identify available agent module may be configured to consider the amount of time agents who are actively engaged in matters (e.g., communications) have been engaged in the matters with respect to an average time for handling such matters to identify those agents who may become available in time to handle the expected call. Furthermore, in particular embodiments, the identify available agent module may also be configured to consider and remove any agents who would otherwise be available but are scheduled for/involved in another activity (such as a break or training) that will make them unavailable.

The identify available agent module determines whether any agents have been identified as being available to handle the expected call in Operation 320. If not, then the identify available agent module determines whether an amount of time has elapsed for attempting to identify an available agent in Operation 325. Here, in particular embodiments, the contact center may establish a maximum amount of time (such as the expected response time for example) to attempt to identify an available agent for a particular record. If the amount of time to identify an available agent has not lapsed, then the identify available agent module returns to Operation 315 and attempts to identify any available agents. However, if the time has elapsed, then the identify available agent module returns a message indicating that no available agent could be identified to handle the expected call from sending the limited-content text message in Operation 330.

However, if one or more available agents are identified, then the identify available agent module selects one or more of the identified agents in Operation 335. Depending on the embodiment, the selection of particular agents from the group of available of agents may be based on one or more factors. For instance, in particular embodiments, agents may be removed from the group of available agents simply because the agents have already been identified for another call expected to be received close to the same time. However with that said, these agents may not be eliminated in some instances because a call is not always going to result from sending a debtor a limited-content text message. Instead, a debtor may simply ignore the text message. Therefore, in particular embodiments, an available agent may be identified for more than one expected call and the selection of a particular agent from the group of available agents may be based on the number of expected calls the agent has already been identified to handle.

Another factor that may be considered in particular embodiments is the amount of time an agent had been available. For instance, if an agent has been available for over five minutes, then the identify available agent module may be configured to initially avoid selecting this agent because the contact center would like for the agent to remain available so that a call can be directed to the agent as soon as possible, instead of having the agent wait for an expected call to arrive. The reason behind considering such a factor is because many contact centers are concerned with maximizing the utilization of their agent resources. Therefore, such contact centers may wish to minimize an agent's "downtime" so that utilization of the particular agent is maximized.

Finally, another factor that may be considered in particular embodiments is whether any of the available agents has a past relationship with the debtor who is to receive the limited-content text message. For instance, the debtor may have spoken with one or more of the agents who work for the contact center in the past and therefore, may have established some type of decorum with these agents. Therefore, the identify available agent module in particular embodiments may be configured to consider whether any of the available agents has communicated with the debtor in the past in determining which agents to select. Those of ordinary skill in the art can envision other factors that may be considered in selecting one or more of the available agents.

At this point, the embodiment of the identify available agent module shown in FIG. 3 reserves the one or more selected agents in Operation 340. As a result of reserving the agents, the number of matters handled by these agents (e.g., the number of communications that may be routed to these agents) may be limited during a time period when the call is expected from the debtor. That is to say, the number of matters these reserved agents are available to handle may be limited so that the agents will be available when the expected call is received from the debtor.

For example, the identify available agent module may reserve an available agent for a particular limited-content text message to be sent to a debtor. In this instance, the agent who has been reserved has the capability to handle either a text message or an email at the same time the agent is handling a telephone call. However, if the agent is handling a text message and an email concurrently, then the agent cannot handle a call. Therefore, during the time the agent has been reserved for the expected call, the contact center is limited to sending either a text message or an email to the agent. The contact center cannot send both since the agent cannot handle a text message and an email along with a phone call at the same time.

Accordingly, the number of agents who are reserved for a particular limited-content text message to be sent and the amount of time these agents may remain reserved waiting for an expected call may vary depending on the embodiment. For instance, particular contact centers may not wish to tie up (reserve) more than one agent for any particular text message so that these centers have the maximum number of agents available at any given time to handle communications for the contact centers. While in other instances, particular contact centers may have the view that ensuring an agent is available to handle a call that is received from a debtor responding to a limited-content text message is paramount and therefore, such contact centers may reserve more than one agent for each text message.

The same views may be taken with respect to the amount of time an agent is reserved waiting for an expected call. For instance, one contact center may only reserve agents for a very limited amount of time (e.g., five minutes) with respect to the time a call is expected to be received, at which point the agents are unreserved (freed) and made available to handle other communications. While another contact center may reserve agents for a longer amount of time that extends beyond the time the contact center is expecting to receive a call. Those of ordinary skill in the art can envision several different combinations of the number of agents who are reserved for a particular limited-content text message and the amount of time such agents may remain reserved waiting for an expected call in light of this disclosure.

However, with that said, other embodiments of the identify available agent module may be configured to simply identify one or more agents without reserving them. In these instances, the contact center may wish to identify one or more agents so that their names may be inserted in the content of the text message, without necessarily wanting to reserve these agents and limit the matters they are able to handle for the contact center.

Finally, the identify available agent module returns information on the agents who have been selected (and in some instances, reserved) in Operation 345. For instance, in particular embodiments, the identify available agent module returns the information on the agents who have been selected to handle the particular limited-content text message to the pacing module.

Identify Current Agent Module

Figure 4:
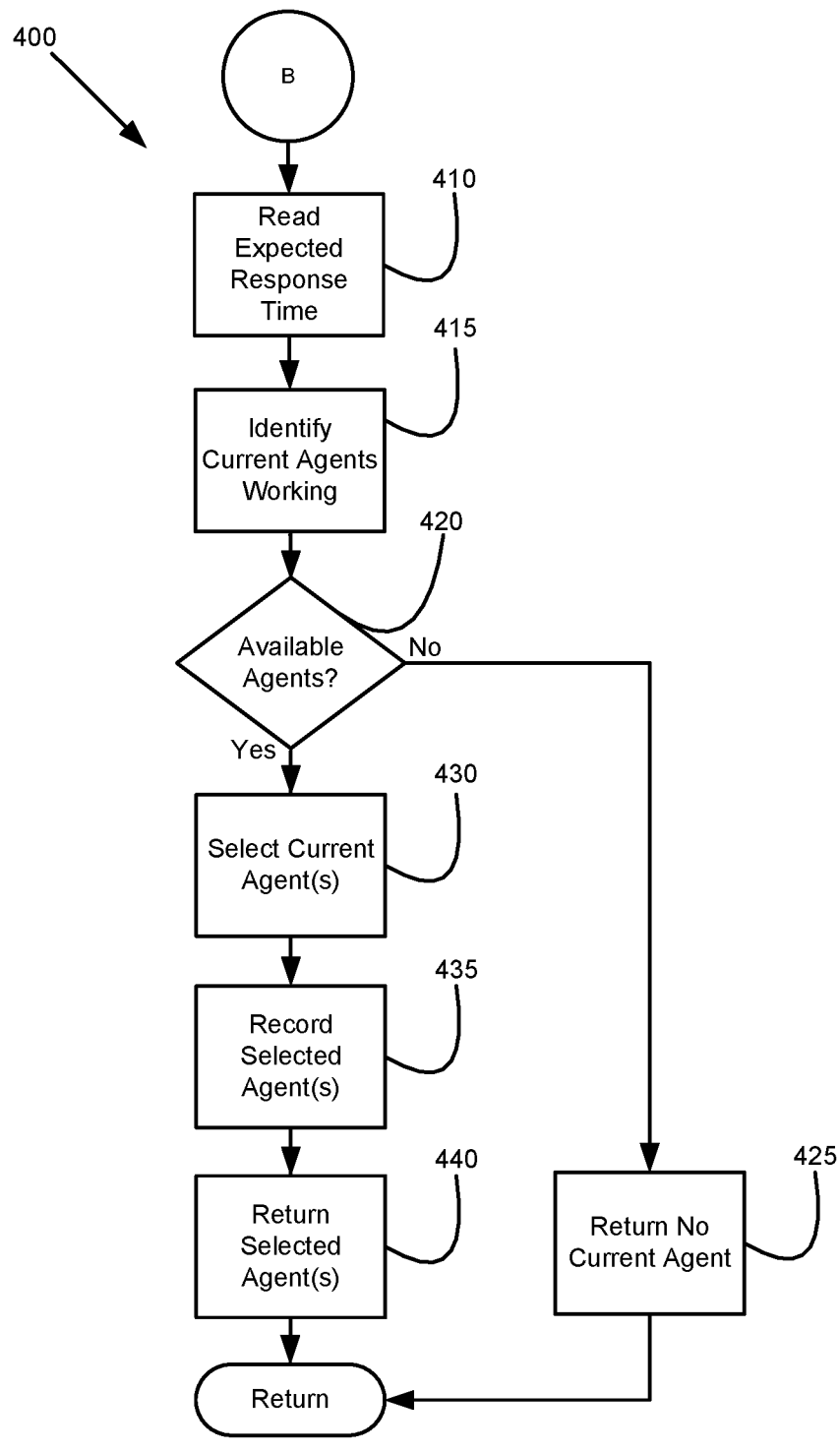
FIG. 4 is a flowchart illustrating an identify current agent module that can be used in accordance with various embodiments of the present invention.

Additional details are provided in FIG. 4 regarding a process flow for identifying one or more agents who are currently working to handle a call expected from a debtor who has received a limited-content text message. In particular, FIG. 4 is a flow diagram showing an identify current agent module for performing such functionality according to various embodiments of the invention. For example, the flow diagram shown in FIG. 4 may correspond to operations carried out by one or more processors in one or more components, such as, for example, a contact device 131 like an ACD, a dialer, or a gateway or a CM 150, as it executes the identify current agent module stored in the component's volatile and/or nonvolatile memory.

As the reader may recall, the identify current agent module may also be invoked by the pacing module in various embodiments upon the pacing module determining the expected response time for a particular record is during the current shift (workday). That is to say, the pacing module may invoke the identify current agent module as a result of determining a call is expected to be received from a debtor for a particular limited-content message during the current shift. However, in other embodiments, the identify current agent module may be invoked by a different module or may be a stand-alone module that independently executes to identify one or more agents for a particular limited-content text message to be sent to a debtor.

Accordingly, the process 400 begins in various embodiments with the identify current agent module reading the expected response time in Operation 410. Similar to the identify available agent module, depending on the embodiment, the identify current agent module may be provided the expected response time from another module such as the pacing module, or the identify current agent module may retrieve the expected response time from some type of data store 175.

Next, the identify current agent module identifies the agents currently working for the shift in Operation 415. The identify current agent module may identify the agents currently working for the shift using different techniques depending on the embodiment. For instance, in particular embodiments, the identify current agent module may gather information on the agents who are currently logged into a workstation from a component such as a contact device 131. While in other embodiments, the identify current agent module may query a WFM 155 to obtain information on the agents who are scheduled to work the current shift.

Next, the identify current agent module determines whether any agents are currently working in Operation 420. If not, then the identify current agent module returns a message indicating no agents are currently available in Operation 425. However, if agents are currently working, then the identify current agent module selects one or more of the current agents based on the expected response time in Operation 430.

Similar to the identify available agent module, the identify current agent module may consider one or more factors in selecting the one or more agents. For instance, in particular embodiments, the selection of a particular agent may be based on the number of expected calls the agent has already been identified to handle. While other factors that may be considered in particular embodiments such as whether the agent is scheduled for an event like a break or training at the time when the call is expected and/or whether any of the current agents has a past relationship with the debtor.

Accordingly, the identify current agent module in particular embodiments records the one or more selected agents in Operation 435. As a result of recording the agents, the agents may be reserved in various embodiments at a time approximate to when the inbound call is expected from the debtor. As a result, the number of matters that may be handled by these agents (e.g., the number of communications that may be routed to these agents) may be limited during that time period. In addition, the amount of time these agents may remain reserved waiting for an expected call may vary depending on the embodiment.

Further, it is noted that the identify current agent module may be configured in particular embodiments to record the selected agents for a particular limited-content text message in a staggered fashion over the time period in which the inbound call is expected to be received from the debtor. For example, the time window in which an inbound call is expected to be received for a limited-content message sent to a particular debtor may be 1:15 p.m. to 1:30 p.m. Here, the identify current agent module may identify three agents who are currently working the shift to handle the inbound call and records the first selected agent to handle the call during 1:15 to 1:20 of the time window, the second selected agent to handle the call during 1:21 to 1:25 of the time window, and the third selected agent to handle the call during 1:26 to 1:30 of the time window. Under this configuration, only one agent is reserved to handle the call from the debtor at any given time during the time window, although three agents have been identified to handle the call.

Finally, the identify current agent module returns information on the agents who have been selected in Operation 440. For instance, in particular embodiments, the identify current agent module returns the information on the agents who have been selected for the particular limited-content text message to the pacing module.

Identify Scheduled Agent Module

Additional details are provided in FIG. 5 regarding a process flow for identifying one or more agents who are scheduled to work to handle a call expected from a debtor who has received a limited-content text message. In particular, FIG. 5 is a flow diagram showing an identify scheduled agent module for performing such functionality according to various embodiments of the invention. For example, the flow diagram shown in FIG. 5 may correspond to operations carried out by one or more processors in one or more components, such as, for example, a contact device 131 like an ACD, a dialer, or a gateway or a CM 150, as it executes the identify scheduled agent module stored in the component's volatile and/or nonvolatile memory.

Similar to the identify available agent module and the identify current agent module, the identify scheduled agent module may also be invoked by the pacing module in various embodiments upon the pacing module determining the expected response time for a particular record is beyond the current shift. However, in other embodiments, the identify scheduled agent module may be invoked by a different module or may be a stand-alone module that independently executes to identify one or more agents for a particular limited-content text message to be sent to a debtor.

Accordingly, the identify scheduled agent module in various embodiments performs operations quite similar to the identify current agent module. Thus, the process 500 begins in various embodiments with the identify scheduled agent module reading the expected response time in Operation 510. Again, depending on the embodiment, the identify scheduled agent module may be provided the expected response time from another module such as the pacing module, or the identify scheduled agent module may retrieve the expected response time from some type of data store 175.

Next, the identify scheduled agent module identifies the agents who are scheduled to work when the call is expected to be received in Operation 515. Here, in various embodiments, the identify scheduled agent module may query a WFM 155 to obtain such information on the agents who are scheduled to work when the call is expected to be received.

The identify scheduled agent module then determines whether any agents are scheduled to work when the call is expected in Operation 520. If not, then the identify scheduled agent module returns a message indicating no agents are scheduled to work when the call is expected in Operation 525. However, if agents are scheduled to work, then the identify scheduled agent module selects one or more of the agents scheduled to work in Operation 530. Again, the identify scheduled agent module may consider one or more factors in selecting the one or more agents such as the number of expected calls an agent has already been identified to handle, whether the agent is scheduled for an event such as a break or training at the time when the call is expected to be received, and whether any of the agents who are scheduled has a past relationship with the debtor who is to receive the limited-content text message.

Once selected, the reserve scheduled agent module records the one or more selected agents in Operation 535. Again, similar to the identify current agent module, the identify scheduled agent module may be configured in particular embodiments to record the selected agents for a particular limited-content text message in a staggered fashion over the time period in which the inbound call is expected to be received from the debtor.

As a result of recording the agents, the agents may be reserved in particular embodiments at the time approximate when the call is expected so that the number of matters handled by the agents (e.g., the number of communications routed to the agents) may be limited during that time period. In addition, the number of agents who are identified for a particular limited-content text message to be sent and the amount of time these agents may remain reserved waiting for an expected call may vary depending on the embodiment.

Finally, the identified scheduled agent module returns information on the agents who have been selected in Operation 540. For instance, in particular embodiments, the identify current agent module returns the information on the agents who have been selected for the particular limited-content text message to the pacing module.

Reserve Agent Module

Figure 6:
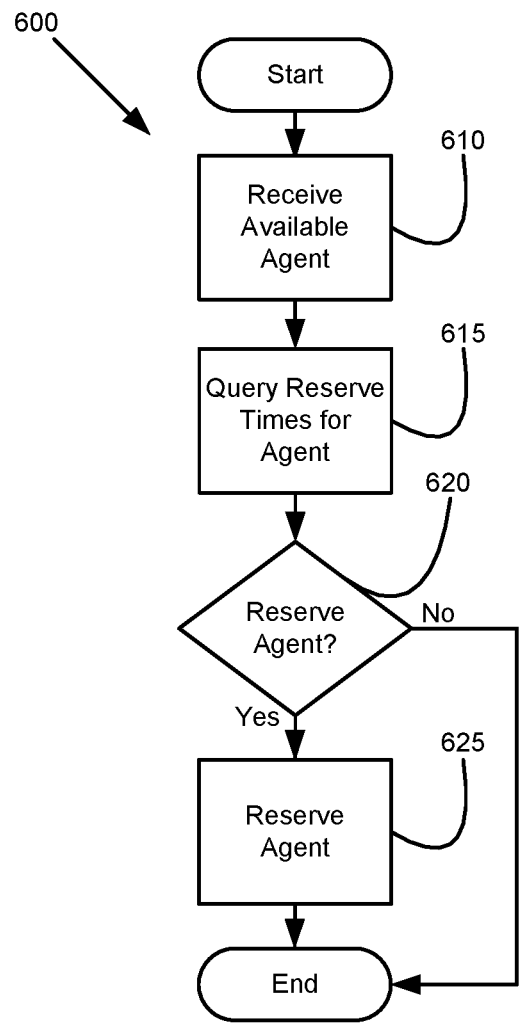
FIG. 6 is a flowchart illustrating a reserve agent module that can be used in accordance with various embodiments of the present invention.

Additional details are provided in FIG. 6 regarding a process flow for reserving an agent who has been identified to handle an expected incoming (inbound) call to a contact center. In particular, FIG. 6 is a flow diagram showing a reserve agent module for performing such functionality according to various embodiments of the invention. For example, the flow diagram shown in FIG. 6 may correspond to operations carried out by one or more processors in one or more components, such as, for example, a contact device 131 like an ACD or a CM 150, as it executes the reserve agent module stored in the component's volatile and/or nonvolatile memory.

The process 600 begins in various embodiments with the reserve agent module receiving information on an agent who has become available in Operation 610. Here, in particular embodiments, the reserve agent module may be invoked and receive such information from a component within the contact center such as a contact device 131. For example, a contact device 131 may receive status information on an agent who has wrapped up handling a communication for the contact center and is now available to handle a new communication. In turn, the contact device 131 may invoke the reserve agent module and provide the module with information on the agent who has become available so that the agent may be checked as to whether the agent should be reserved because the agent has been select to handle a potential inbound call that is expected to be received within a short amount of time.

Accordingly, the reserve agent module queries times for which the agent is to be reserved to handle an expected inbound call in Operation 615. As previously mentioned, when an agent has been identified to potentially handle an expected inbound call resulting from sending a limited-content text message to a debtor, information on the agent may be recorded. Here, this information may identify a time (window of time) the agent should be reserved so that the agent is available to handle the inbound call if received. Therefore, in these particular embodiments, the reserve agent module queries this recorded information to find the time(s) (e.g., period of time) that the agent should be reserved.

Once queried, the reserve agent module determines whether the agent should be reserved at the present moment based on the queried information for the agent in Operation 620. If not, then the reserve agent module simply ends the process 600. However, if the queried information for the agent indicates the agent should be reserved, then the reserve agent module reserves the agent in Operation 625. Accordingly, reserving the agent in various embodiments results in limiting the matters that can be handled by the agent for a set period of time. For instance, the contact center may limit the number and/or type of communications that can be sent to the agent during the set period of time. Accordingly, as a result of reserving the agent, the agent may then be available to handle the expected inbound call when it is received by the contact center.

Free Agent Module

Figure 7:
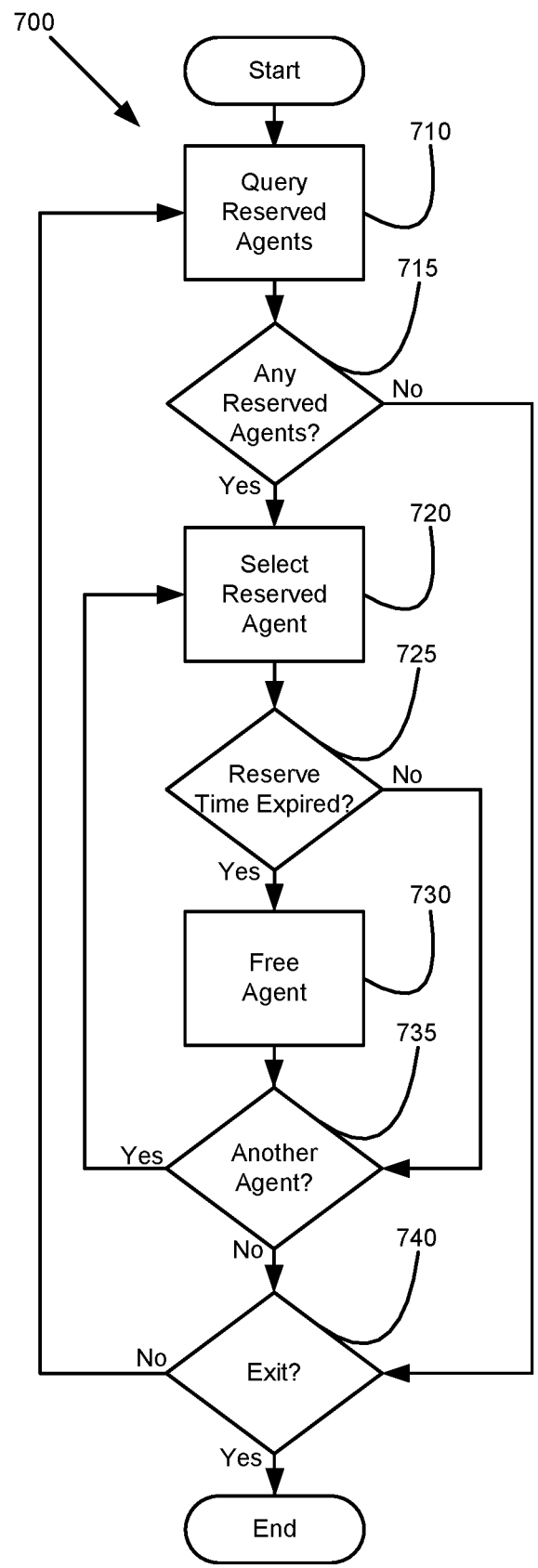
FIG. 7 is a flowchart illustrating a free agent module that can be used in accordance with various embodiments of the present invention.

Additional details are provided in FIG. 7 regarding a process flow for freeing one or more agents who have been reserved. In particular, FIG. 7 is a flow diagram showing a free agent module for performing such functionality according to various embodiments of the invention. For example, the flow diagram shown in FIG. 7 may correspond to operations carried out by one or more processors in one or more components, such as, for example, a contact device 131 like an ACD or a CM 150, as it executes the free agent module stored in the component's volatile and/or nonvolatile memory.

Accordingly, the process 700 begins in various embodiments with the free agent module querying the agents who are currently reserved in Operation 710. Again, depending on the embodiment, information on the agents who are currently reserved may be store in one or more data stores 175. In addition, depending on the embodiment, the information may identify pieces of information such as when was the agent reserved and the set period of time the agent should be reserved.

Accordingly, the free agent module determines whether the queried results have identified any agents who have been reserved in Operation 715. If so, then the free agent module selects one of the reserved agents in Operation 720 and determines whether the period of time the agent is to be reserved has expired in Operation 725. If not, then the free agent module moves on to the next agent found in the queried results. However, if the period of time has expired, then the free agent module frees the agent in Operation 730. Here, in particular embodiments, the free agent module is configured to change the status of the agent from reserved to available. As a result, the agent may now be available to handle other matters for the contact center such as other communications.

Once the selected agent has been evaluated, the free agent module determines whether another agent is identified in the queried results in Operation 735. If so, then the module returns to Operation 720, selects the next reserved agent, and repeats the operations already discussed for the newly selected agent. Once all of the reserved agents have been evaluated, the free agent module determines whether to exit the process 700 in Operation 740. For instance, the work shift (workday) may have ended, and the contact center may decide to shut down the process 700 accordingly.

Call Routing Module

Figure 8:
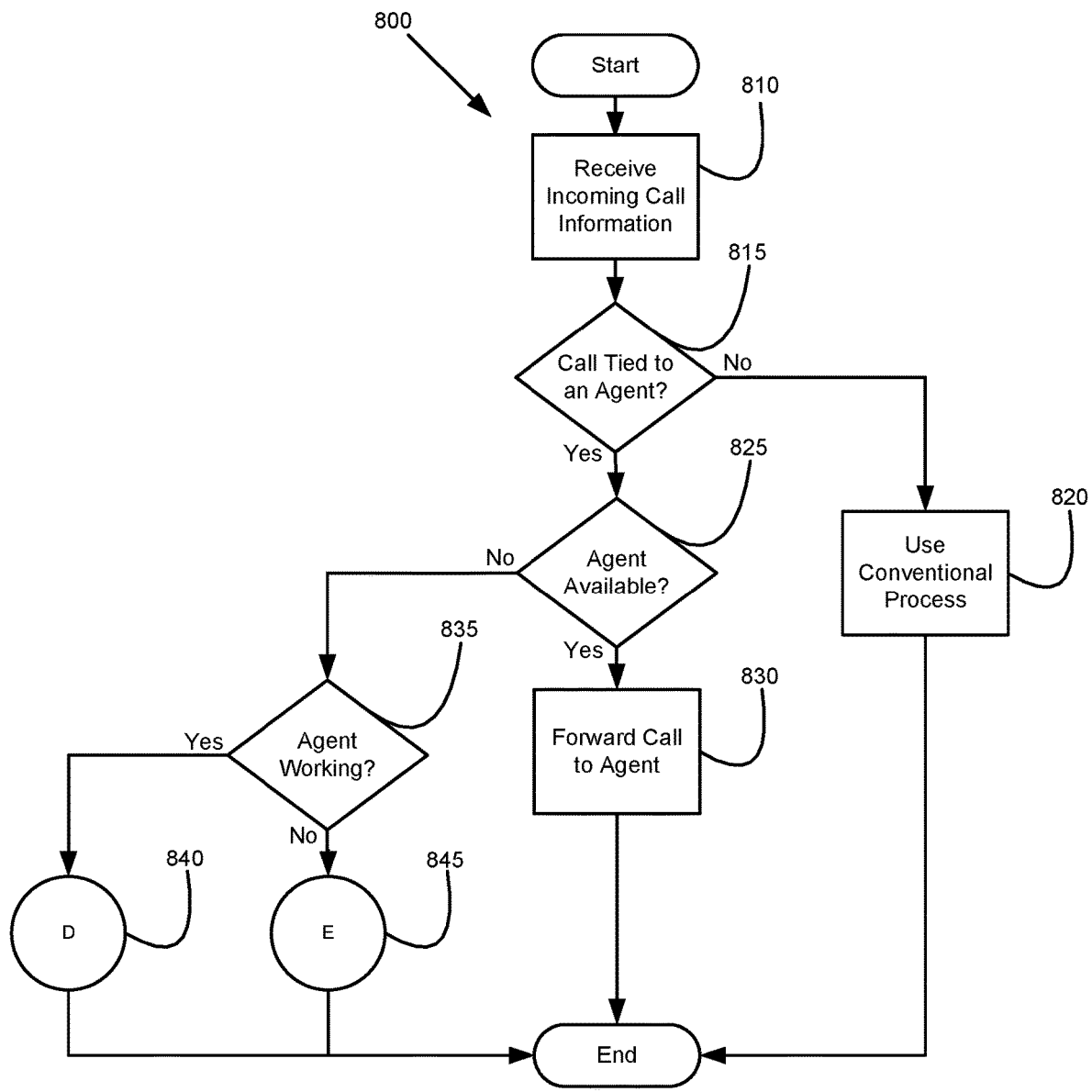
FIG. 8 is a flowchart illustrating a call routing module that can be used in accordance with various embodiments of the present invention.

Additional details are provided in FIG. 8 regarding a process flow for routing an incoming (inbound) call to a contact center. In particular, FIG. 8 is a flow diagram showing a call routing module for performing such functionality according to various embodiments of the invention. For example, the flow diagram shown in FIG. 8 may correspond to operations carried out by one or more processors in one or more components, such as, for example, a contact device 131 like an ACD or a CM 150, as it executes the call routing module stored in the component's volatile and/or nonvolatile memory.

In various embodiments, the contact center initially routes a received call to an IVR 130. In turn, the IVR 130 gathers information from the caller on the reason for the call. For instance, if the caller is a debtor who has called the contact center as a result of receiving a limited-content text message, then the caller may ask to speak with a particular agent.

With this in mind, the process 800 begins with the call routing module receiving information on the incoming call in Operation 810. Here, depending on the embodiment and the reason for the call, the call routing module may receive information on the caller (debtor) and/or information indicating the caller has asked for a particular agent. In other words, the call routing module may receive information indicating the call is the result of a limited-content text message that was sent to the caller.

Accordingly, the call routing module determines whether the call is tied to a particular agent in Operation 815. If the call is not tied to a particular agent, then the call routing module uses a conventional process to route the call to an agent to handle in Operation 820. For instance, in particular embodiments, the call routing module may consider what agents are currently available and/or what skills are necessary to handle the call and select an agent accordingly. Those of ordinary skill in the art of contact centers are familiar with the conventional routing of telephone calls in such centers.

However, if the call is tied to a particular agent (e.g., the caller has asked to speak with a particular agent), then the call routing module checks the agent's availability in Operation 825. This particular operation may involve the call routing module having to check an alias provided by the caller to obtain the actual agent who should receive the call.

Here, the agent asked for by the caller (debtor) is likely the agent who appeared in the text message received by the caller. Therefore, this agent has been reserved in various embodiments in an attempt to ensure the agent will be available to handle the call when it is received by the contact center. However, identifying an agent to reserve does not necessarily guarantee the agent will actually be reserved and available when the call is received. For example, the agent may not have been timely reserved because the agent is still handling another call that is taking longer than expected, the agent may have been reserved for another call during the same time and is now fielding that call, or the agent may have become ill and left work for the day.

If the agent is available, then the call routing module forwards the call to the agent in Operation 830. At that point, the agent engages with the caller on the call. However, if the agent is not available, then the contact center may take different actions to handle the call depending on the embodiment. For instance, the contact center may want to give the caller the opportunity to be placed on hold and wait for the agent to become available. However, in particular embodiments, this option may only be provided to the caller if the wait time is less than a threshold amount of time to avoid frustrating a caller by having the caller remain on hold for too long.

Another action that may be taken by the contact center is to have the caller forwarded to a different agent who is currently available. For instance, the caller may not have any affinity for the agent identified by the caller to speak with. Instead, the agent may have been identified by the caller simply because the agent's name was found in the text message received by the caller. Therefore, the caller may be perfectly fine speaking with a different agent.

Figure 9:
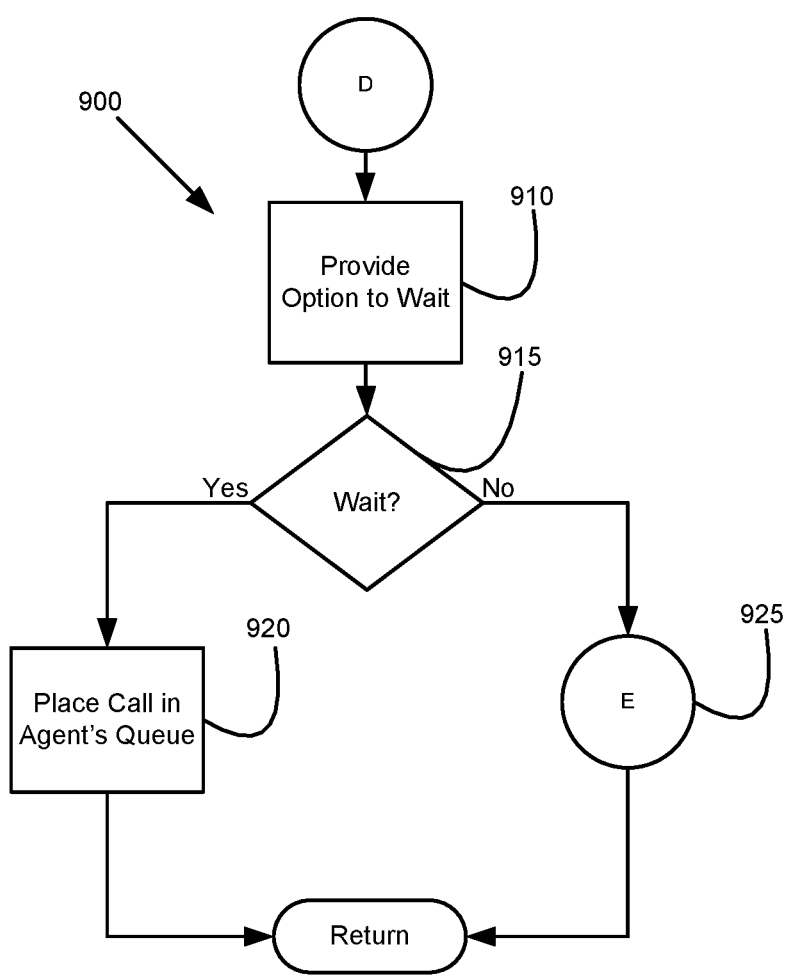
FIG. 9 is a flowchart illustrating a wait option module that can be used in accordance with various embodiments of the present invention.

Therefore, the process shown in FIG. 8 involves the call routing module initially determining whether the agent identified by the caller is currently working in Operation 835 when the agent is not immediately available. If the agent is currently working, then the call routing module provides the caller with the option to be placed on hold and wait for the agent in Operation 840. Here, the call routing module performs this operation in particular embodiments by invoking a wait option module (FIG. 9). In turn, the wait option module provides the caller with the option to be placed on hold and if the caller agrees, then the wait option module places the call in the agent's queue to wait for the agent to become available.

Figure 10:
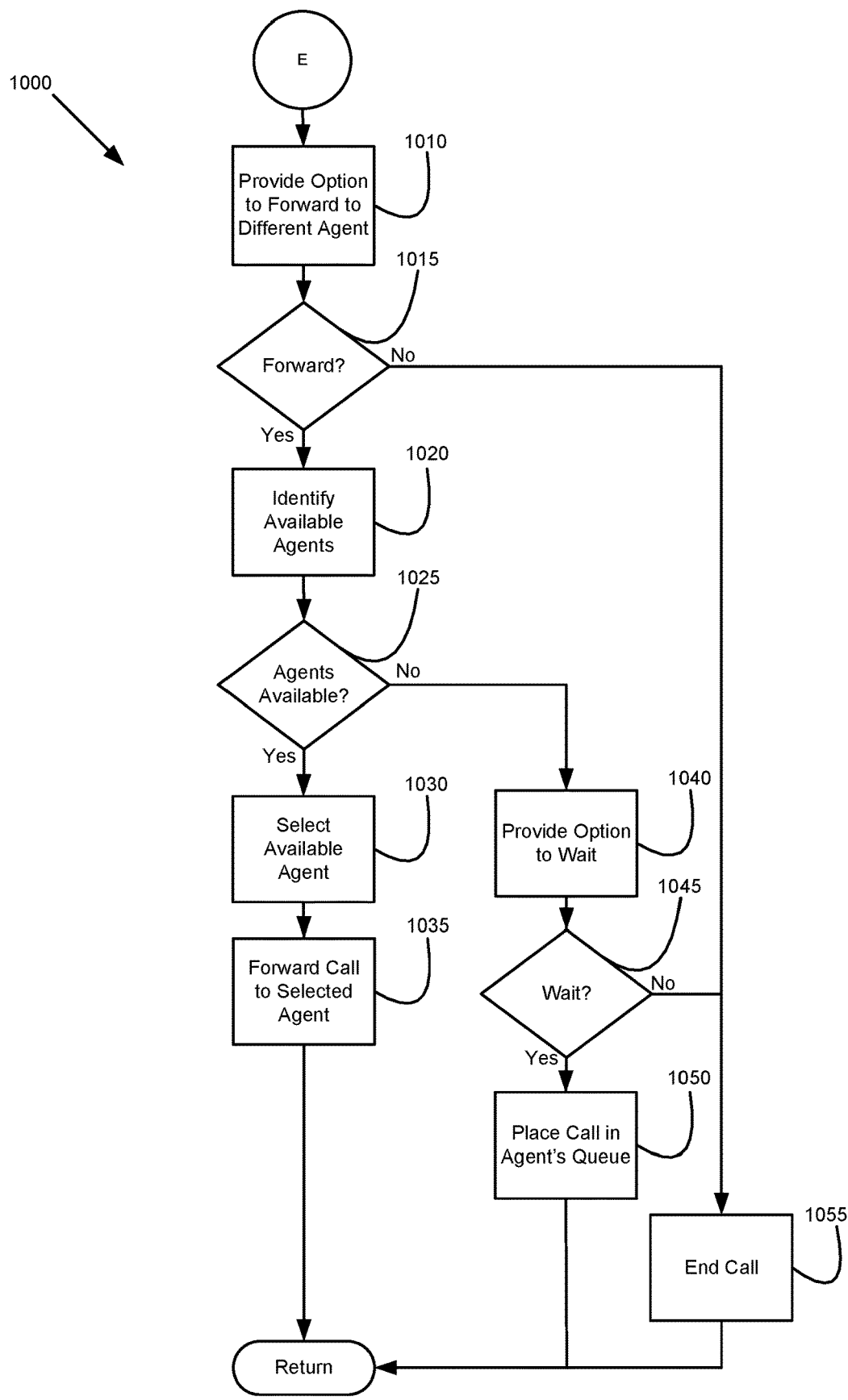
FIG. 10 is a flowchart illustrating a forward option module that can be used in accordance with various embodiments of the present invention.

However, if the agent is not currently working, then the call routing module provides the caller with the option to be forwarded to a different agent in Operation 845. The call routing module performs this operation in particular embodiments by invoking a forward option module (FIG. 10). Here, the forward option module provides the caller with the option to be forwarded to a different agent and if the caller agrees, the forward option module identifies the available agents to handle the call, selects one of the available agents, and forwards the call to the selected agent accordingly.

Wait Option Module

Additional details are provided in FIG. 9 regarding a process flow for providing a caller with an option to wait on a particular agent to become available. In particular, FIG. 9 is a flow diagram showing a wait option module for performing such functionality according to various embodiments of the invention. For example, the flow diagram shown in FIG. 9 may correspond to operations carried out by one or more processors in one or more components, such as, for example, a contact device 131 like an ACD or a CM 150, as it executes the wait option module stored in the component's volatile and/or nonvolatile memory.

As just discussed, the wait option module may be invoked by the call routing module in various embodiments upon the call routing module determining an agent who has been identified by a caller is not available but is currently working. However, in other embodiments, the wait option module may be invoked by a different module or may be a stand-alone module that independently executes to provide a caller with the option to be placed on hold and wait for a particular agent.

The process 900 begins with the wait option module providing the caller with the option to be placed on hold and wait for the agent to become available in Operation 910. In particular embodiments, the wait option module may also provide the caller with an estimated wait time so that the caller can make a more informed decision as to whether or not he or she wishes to be placed on hold and wait for the agent to become available.

Accordingly, the wait option module determines whether the caller wishes to be placed on hold and wait for the agent to become available in Operation 915. If the caller does wish to wait, then the wait option module places the call in the agent's queue in Operation 920 to wait for the agent to become available. In particular embodiments, the call may be given priority in the queue with respect to other calls that are already in the queue.

However, if the caller does not wish to wait for the agent to become available, then the wait option module provides the caller with the option to be forwarded to a different agent in Operation 925. Similar to the call routing module, the wait option module performs this operation in particular embodiments by invoking the forward option module. As previously mentioned, the forward option module provides the caller with the option to be forwarded to a different agent and if the caller agrees, the forward option module identifies the agents available to handle the call, selects one of the available agents, and forwards the call to the selected agent accordingly.

Forward Option Module

Additional details are provided in FIG. 10 regarding a process flow for providing a caller with an option to be forwarded to a different agent. In particular, FIG. 10 is a flow diagram showing a forward option module for performing such functionality according to various embodiments of the invention. For example, the flow diagram shown in FIG. 10 may correspond to operations carried out by one or more processors in one or more components, such as, for example, a contact device 131 like an ACD or a CM 150, as it executes the forward option module stored in the component's volatile and/or nonvolatile memory.

As previously discussed, the forward option module may be invoked by the call routing module or the wait option module in various embodiments. However, in other embodiments, the forward option module may be invoked by a different module or may be a stand-alone module that independently executes to provide a caller with the option to be forwarded to a different agent.

The process 1000 begins with the forward option module providing the caller with the option to be forwarded to a different agent in Operation 1010. Once provided, the forward option module determines whether the caller is willing to be forwarded to another agent in Operation 1015.

If the caller does not wish to be forwarded to a different agent, then the forward option module ends the call in Operation 1055. In particular embodiments, the forward option module may end the call by providing the caller with one or more options such as leaving a message for the agent identified by the caller and/or allowing the caller to set up a callback by the agent identified by the caller.

However, if the caller indicates a desire to be forwarded to another agent, then the forward option module identifies the agents who are currently available in Operation 1020. The forward option module then determines whether any agents are available in Operation 1025. If so, then the forward option module selects an available agent in Operation 1030 and forwards the call to the available agent in Operation 1035.

However, if an agent is not available, then the forward option module provides the caller the option to be placed on hold and wait for an agent to become available in Operation 1040. Similar to the wait option module, the forward option module determines whether the caller wishes to be placed on hold and wait for an agent to become available in Operation 1045. If the caller does wish to wait, then the forward option module selects an agent and places the call in the agent's queue in Operation 1050 to wait for the agent to become available. Again, in particular embodiments, the call may be given priority in the queue with respect to other calls already in the queue.

However, if the caller does not wish to wait for an agent to become available, then the forward option module ends the call in Operation 855. As previously mentioned, in particular embodiments, the forward option module may end the call by providing the caller with one or more options such as leaving a message for the agent identified by the caller and/or allowing the caller to set up a callback by the agent identified by the caller.

Exemplary Processing Device Architecture

Figure 11:
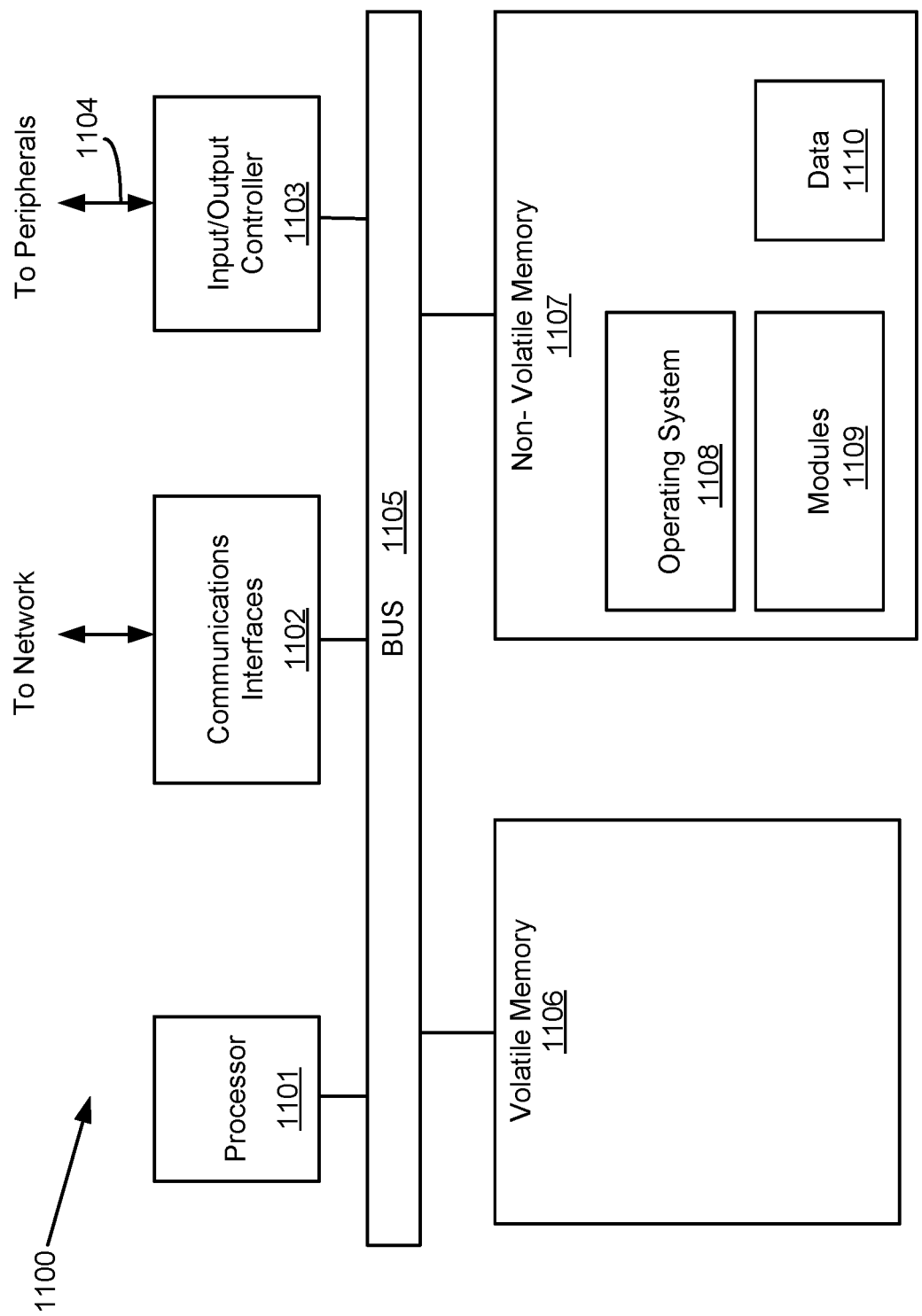
FIG. 11 illustrates an embodiment of a processing device for practicing various technologies and concepts disclosed herein.

As discussed in conjunction with FIG. 1, the contact center architecture 100 may comprise various components that comprise a processing system. FIG. 11 is an exemplary schematic diagram of a processing component 1100 that may be used in an embodiment of the contact center architecture 100 to practice the technologies disclosed herein such as, for example, the contact device(s) 131, IVR 130, ITR 140, CM 150, WFM 155, or other component previously described. In general, the term "processing component" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 11, the processing component 1100 may include one or more processors 1101 that may communicate with other elements within the processing component 1100 via a bus 1105. The processor 1101 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing component 1100 may also include one or more communications interfaces 1102 for communicating data via the local network with various external devices, such as other components of FIG. 1. In other embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1103 may also communicate with one or more input devices or peripherals using an interface 1104, such as, but not limited to: a keyboard, a mouse, a touch screen/display input, microphone, pointing device, etc. The input/output controller 1103 may also communicate with output devices or peripherals, such as displays, printers, speakers, headsets, banner displays, etc.

The processor 1101 may be configured to execute instructions stored in volatile memory 1106, non-volatile memory 1107, or other forms of computer-readable storage media accessible to the processor 1101. The volatile memory 1106 may comprise various types of memory technologies, including, but not limited to: random access memory ("RAM"), dynamic random access memory ("DRAM"), static random access memory ("SRAM"), and other forms well known to those skilled in the art. The non-volatile memory 1107 may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1107 may store program code and data, which also may be loaded into the volatile memory 1106 at execution time. Specifically, the non-volatile memory 1107 may store one or more program modules 1109, such as the modules described above containing instructions for performing the processes and/or functions associated with the technologies disclosed herein, and/or operating system code 1108. In addition, these program modules 1109 may also access, generate, or store data 1110 in the non-volatile memory 907, as well as in the volatile memory 1106. The volatile memory 1106 and/or non-volatile memory 1107 may be used to store other information including, but not limited to: records, applications, programs, scripts, source code, object code, byte code, compiled code, interpreted code, machine code, executable instructions, or the like. These may be executed or processed by, for example, the processor 1101 and/or may form a part of, or may interact with, the program modules 1109.

The technologies described herein may be implemented in various ways, including as computer program products comprising memory storing instructions causing a processor to perform the operations associated with the above technologies. The computer program product may comprise a tangible non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified media (including volatile and non-volatile media), but does not include a transitory, propagating signal. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer-readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Applicant notes that the disclosure is provided herein in the context of pacing limited-content text messages as defined in the new rules proposed by the CFPB for governing activities of debt collectors to generate inbound calls from debtors. However, various embodiments of the invention may be used in other context besides the sending of limited-content text messages. For instance, embodiments of the invention may also be used in the context of pacing outbound telephone calls to leave a limited-content voice message for a debtor to generate an inbound call from the debtor. While yet other embodiments of the invention may also be used in the context of pacing telephone calls, text messages, emails, or other electronic communications outside of debt collection to generate inbound communications, such as calls or text messages, from these parties. Similar to limited-content text messages, the content of the telephone calls, text messages, emails, or other electronic communications in these instances may also identify specific individuals (e.g., agents) for the parties to contact.

Accordingly, many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method comprising:
deriving an expected response time, the expected response time comprising a time an inbound communication is expected to be received at a contact center from a party after an outbound communication has been sent to the party, wherein the inbound communication comprises a voice call from the party for the contact center;
identifying, before sending the outbound communication to the party and based on the expected response time, an agent who is expected to be available to handle the inbound communication when the inbound communication is received from the party at the contact center;
composing content of the outbound communication, wherein the outbound communication identifies the agent;
sending the outbound communication by a contact device to the party; and
routing the inbound communication to the agent after the inbound communication is received by the contact center,
wherein the outbound communication is at least one of a telephone call, a text message, an e-mail, or another electronic communication, and
wherein the expected response time is based on at least one of historical expected response time data or records of previous interactions with the party.

2. The method of claim 1, wherein identifying the agent is based on a capability of the agent to handle simultaneous communications or a number of inbound communications for the agent to handle.

3. The method of claim 1, further comprising:
deriving a second time to send the outbound communication to the party, the second time maximizing a likelihood of generating the inbound communication,
wherein the outbound communication is sent at the second time.

4. The method of claim 1, further comprising:
deriving a second time to send the outbound communication to the party, the second time maximizing a likelihood of obtaining a promise to pay on a debt from the party,
wherein the outbound communication is sent at the second time.

5. The method of claim 1, wherein deriving the expected response time comprises:
deriving an expected amount of time that the party is expected to take to respond after receiving the outbound communication; and
determining the expected response time based on a transmission time in which the outbound communication is sent to the party and the expected amount of time.

6. The method of claim 1, wherein the inbound communication is routed to the agent as a result of the party requesting to be connected with the agent.

7. A non-transitory computer readable medium comprising instructions that, when executed by at least one computer processor, cause the at least one computer processor to:
identify, before sending an outbound communication to the party and based on an expected response time, an agent who is expected to be available to handle an inbound communication when the inbound communication is received at a contact center from a party,
wherein the inbound communication comprises a voice call from the party for the contact center, and
wherein the expected response time comprises a time the inbound communication is expected to be received at the contact center from the party after the outbound communication has been sent to the party;
compose content of the outbound communication, wherein the outbound communication identifies the agent;
cause the outbound communication to be sent by a contact device; and
route the inbound communication to the agent after the inbound communication is received by the contact center,
wherein the outbound communication is at least one of a telephone call, a text message, an e-mail, or another electronic communication, and
wherein the expected response time is based on at least one of historical expected response time data or records of previous interactions with the party.

8. The non-transitory computer readable medium of claim 7, wherein the instructions further cause the at least one computer processor to identify the agent based on a capability of the agent to handle simultaneous communications or a number of inbound communications for the agent to handle.

9. The non-transitory computer readable medium of claim 7, wherein the outbound communication is sent to the party at a second time that maximizes a likelihood of generating the inbound communication.

10. The non-transitory computer readable medium of claim 7, wherein the outbound communication is sent to the party at a second time that maximizes a likelihood of obtaining a promise to pay on a debt from the party.

11. The non-transitory computer readable medium of claim 7, wherein the expected response time is derived from:
deriving an expected amount of time that the party is expected to take to respond after receiving the outbound communication; and
determining the expected response time based on a transmission time in which the outbound communication is sent to the party and the expected amount of time.

12. The non-transitory computer readable medium of claim 7, wherein the inbound communication is routed to the agent as a result of the party requesting to be connected with the agent.

13. A system comprising:
at least one computer processor configured to:
identify, before sending an outbound communication to the party and based on an expected response time, an agent who is expected to be available to handle an inbound communication received at a contact center from a party,
wherein the inbound communication comprises a voice call from the party for the contact center, and
wherein the expected response time comprises a time the inbound communication is expected to be received at the contact center from the party after the outbound communication has been sent to the party;
compose content of the outbound communication, wherein the outbound communication identifies the agent; and
cause the outbound communication to be sent by a contact device to the party; and
route the inbound communication to the agent after the inbound communication is received by the contact center, wherein the outbound communication is at least one of a telephone call, a text message, an e-mail, or another electronic communication, and wherein the expected response time is based on at least one of historical expected response time data or records of previous interactions with the party.

14. The system of claim 13, wherein the at least one computer processor is configured to identify the agent based on a capability of the agent to handle simultaneous communications or a number of inbound communications for the agent.

15. The system of claim 13, wherein the outbound communication is sent to the party at a second time that maximizes a likelihood of generating the inbound communication.

16. The system of claim 13, wherein the outbound communication is sent to the party at a second time that maximizes a likelihood of obtaining a promise to pay on a debt from the party.

17. The system of claim 13, wherein the expected response time is derived from:

deriving an expected amount of time that the party is expected to take to respond after receiving the outbound communication; and determining the expected response time based on a transmission time in which the outbound communication is sent to the party and the expected amount of time.

18. The system of claim 13, wherein the inbound communication is routed to the agent as a result of the party requesting to be connected with the agent.

* * * * *